(12) United States Patent
Smith et al.

(10) Patent No.: US 7,135,214 B1
(45) Date of Patent: Nov. 14, 2006

(54) PRODUCTION OF A TEXTILE FLOOR COVERING HAVING MORE THAN ONE LAYER, USING AN AQUEOUS POLYMER DISPERSION AS ADHESIVE

(75) Inventors: James Arthur Smith, Arnhem (NL); Bernard Schott, Drusenheim (FR); Leonardus Aan de Meulen, Giesbeek (NL)

(73) Assignee: BASF Aktiengesellschaft, Ludwigshafen (DE)

( * ) Notice: Subject to any disclaimer, the term of this patent is extended or adjusted under 35 U.S.C. 154(b) by 336 days.

(21) Appl. No.: 09/926,109

(22) PCT Filed: Feb. 21, 2000

(86) PCT No.: PCT/EP00/01411

§ 371 (c)(1),
(2), (4) Date: Sep. 4, 2001

(87) PCT Pub. No.: WO00/53842

PCT Pub. Date: Sep. 14, 2000

(30) Foreign Application Priority Data

Mar. 5, 1999 (DE) ................................. 199 09 819

(51) Int. Cl.
*B32B 33/00* (2006.01)
*D06N 7/00* (2006.01)
*C09J 125/10* (2006.01)

(52) U.S. Cl. .......................... 428/97; 428/95; 525/221; 525/222; 525/232; 525/240; 525/241

(58) Field of Classification Search .................. 428/97, 428/95; 156/72; 525/191, 221, 222, 232, 525/233, 240, 241
See application file for complete search history.

(56) References Cited

U.S. PATENT DOCUMENTS

| | | | | |
|---|---|---|---|---|
| 4,009,310 A | * | 2/1977 | Scobbo | ........................ 428/95 |
| 4,191,799 A | * | 3/1980 | Gruber | ........................ 428/96 |
| 4,205,112 A | * | 5/1980 | Mervin | ........................ 428/96 |
| 4,228,058 A | * | 10/1980 | Hulyalkar et al. | .......... 524/501 |
| 5,348,785 A | | 9/1994 | Vinod | |
| 5,403,884 A | | 4/1995 | Perlinski | |
| 5,733,944 A | * | 3/1998 | Balk et al. | ..................... 521/65 |
| 5,763,521 A | * | 6/1998 | Claassen et al. | ............ 524/458 |
| 5,851,625 A | * | 12/1998 | Smesny et al. | ................ 428/95 |
| 5,922,434 A | | 7/1999 | Butterfass et al. | |
| 6,162,848 A | * | 12/2000 | Lattime et al. | ............. 524/272 |
| H2041 H | * | 8/2002 | Patel et al. | ..................... 428/85 |
| 6,610,769 B1 | * | 8/2003 | Scott et al. | ................. 524/426 |
| 6,624,207 B1 | * | 9/2003 | Balk et al. | ..................... 521/70 |

FOREIGN PATENT DOCUMENTS

| | | |
|---|---|---|
| EP | 0 753 404 | 1/1997 |
| WO | WO 96/22414 | 7/1996 |

OTHER PUBLICATIONS

English translation of JP 58-041972.*
English translation of JP 58-152037.*
Derwent Abstracts JP 63-312376, Dec. 20, 1988.
Derwent Abstracts JP 58-152037, Sep. 9, 1983.
Derwent Abstracts JP 58-041972, Mar. 11, 1983.
Derwent Abstracts JP 56-004673, Jan. 19, 1981.

* cited by examiner

*Primary Examiner*—Cheryl A. Juska
(74) *Attorney, Agent, or Firm*—Oblon, Spivak, McClelland, Maier & Neustadt, P.C.

(57) ABSTRACT

Textile floorcoverings composed of more than one layer have their layers bonded by an adhesive which comprises, as binder, an aqueous dispersion of a mixture made from a polymer A) at least 60% by weight of which is composed of ethylene and from a polymer B) at least 60% by weight of which is composed of vinylaromatics, dienes or mixtures of these.

2 Claims, No Drawings

PRODUCTION OF A TEXTILE FLOOR COVERING HAVING MORE THAN ONE LAYER, USING AN AQUEOUS POLYMER DISPERSION AS ADHESIVE

The invention relates to textile floorcoverings composed of more than one layer, wherein the layers have been bonded by an adhesive which comprises, as binder, an aqueous dispersion of a mixture made from a polymer A) at least 60% by weight of which is composed of ethylene and from a polymer B) at least 60% by weight of which is composed of vinylaromatics, dienes or mixtures of these.

The invention further relates to a process for producing this floorcovering, and also to an adhesive which is suitable for producing the floorcoverings.

In producing tufted carpets a thread (pile material) is tufted through a backing fabric, i.e. pulled and then fixed by applying a binder (precoat). The binders used are usually aqueous polymer dispersions, e.g. styrene-butadiene copolymers. To improve the performance of the floorcovering a covering (secondary backing) is bonded to the tufted backing fabric. A suitable adhesive is again an aqueous polymer dispersion, and if desired this polymer dispersion may be identical with the polymer dispersion of the precoat. The production of tufted carpets using styrene-butadiene copolymers is described, for example, in U.S. Pat. No. 5,348,785. EP-A-753404 has disclosed the use of an adhesion promoter to increase the adhesion of the different layers of carpets. The adhesion promoter or adhesive used is a polyethylene dispersion. Dispersions of this type are very expensive. In addition, according to EP-A-753404 another layer of polyethylene powder is needed.

It would be desirable to have very high strength in the resultant composite of tufted backing fabric and secondary backing while using very little adhesive.

It would also be desirable to have short drying times for the aqueous adhesive in order to allow high production rates.

The abovementioned requirements have not yet been satisfactorily fulfilled by currently known floorcoverings or processes for producing floorcoverings.

It is an object of the present invention to provide a floorcovering and a process for producing a floorcovering which fulfill the requirements to a very high degree.

We have found that this object is achieved by means of the floorcovering defined above, a process for its production and an aqueous adhesive suitable for producing the floorcovering.

The adhesive comprises, as binder, an aqueous dispersion. The aqueous dispersion comprises an ethylene polymer A) and a free-radical-polymerized polymer B).

The ethylene polymer comprises at least 60% by weight, preferably at least 70% by weight, of ethylene.

The ethylene polymer A) comprises in particular $a_1$) from 60 to 99.9% by weight, preferably from 70 to 99.5% by weight and particularly preferably from 70 to 95% by weight, of ethylene, and $a_2$) from 0.1 to 40% by weight, preferably from 0.5 to 30% by weight and particularly preferably from 5 to 30% by weight, of an ethylenically unsaturated acid.

Particular ethylenically unsaturated acids $a_2$) are acrylic acid and methacrylic acid.

Examples of other monomers $a_3$) copolymerizable with ethylene are (meth)acrylates, in particular $C_1$–$C_{10}$ (meth)acrylates, such as methyl, ethyl, propyl, butyl or ethylhexyl (meth)acrylates, (meth)acrylonitrile, (meth)acrylamide and vinyl esters such as vinyl acetate or vinyl propionate.

The preparation processes for the ethylene polymers A are known to the skilled worker. Polymers of this type are prepared, for example, by (co)polymerization of ethylene in continuously operating tubular polymerization systems at pressures of from 500 to 5000 bar and at from 50 to 450° C., in the presence of polymerization initiators which decompose to give free radicals.

The molecular weights are generally from about 500 to 40000 Dalton, in particular from 5000 to 20000 Dalton ($M_n$). After the polymerization the polymer A) may preferably be converted into an aqueous dispersion by pressure-emulsification, if desired with addition of a neutralizing agent.

This process of pressure-emulsifying polyethylene to give aqueous (secondary) dispersions is known to the skilled worker.

Suitable neutralizing agents are preferably ammonia, diethylamine, dimethylethanolamine, diethanolamine, etc.

Conventional ionic or nonionic emulsifiers may also be used concomitantly for preparing the dispersion. The emulsions obtained of the polymer A) are preferably pale-color, low-viscosity and finely dispersed with a solids content of from about 20 to 40% and a pH above 8.

Polymer B is composed of at least 60% by weight, preferably at least 80% by weight, of vinylaromatics, dienes or mixtures of these.

Preferred vinylaromatics are α-methylstyrene and styrene. Styrene is preferred.

Particular dienes are isoprene and butadiene. Butadiene is preferred.

The polymer B) preferably comprises $b_1$) from 60 to 99.9% by weight of vinylaromatics, dienes or mixtures of these, and $b_2$) from 0.1 to 20% by weight of ethylenically unsaturated acids, e.g. acrylic acid, methacrylic acid or itaconic acid.

It is particularly preferable for the content of compounds $b_1$) to be from 80 to 99.5% by weight and that of $b_2$) to be from 0.5 to 10% by weight.

Monomers $b_1$) are in particular mixtures of vinylaromatics and dienes in a weight ratio of from 90:10 to 20:80, particularly preferably from 80:20 to 40:60.

The polymers B) are preferably prepared by emulsion polymerization. In the emulsion polymerization the monomers may be polymerized in the usual way in the presence of a water-soluble initiator and of an emulsifier, preferably at from 30 to 95° C.

The free radical polymerization initiators used may be any of those capable of initiating a free-radical aqueous emulsion polymerization. These may be peroxides, e.g. alkali metal peroxodisulfates, dibenzoyl peroxide, butyl perpivalate, tert-butyl 2-ethylperhexanoate, 2,5-dimethyl-2,5-di (tert-butylperoxy)hexane, cumene hydroperoxide, or else azo compounds, such as azobisisobutyronitrile or 2,2-azobis (2-amidinopropane) dihydrochloride.

Combined systems built up from at least one organic reducing agent and at least one peroxide and/or hydroperoxide are also suitable, for example tert-butyl hydroperoxide and sodium hydroxymethanesulfinate or hydrogen peroxide and ascorbic acid. Other suitable combined systems have, in addition, a small amount of a metal compound which is soluble in the polymerization medium and whose metallic component can occur in more than one valence state, e.g. ascorbic acid/iron(II) sulfate/hydrogen peroxide. Instead of ascorbic acid here, use is frequently made of sodium hydroxymethanesulfinate, sodium sulfite, sodium hydrogensulfite or sodium metabisulfite, and instead of hydrogen peroxide use is frequently made of tert-butyl hydroperoxide or alkali metal peroxodisulfate and/or ammonium peroxodisulfates.

The amount of the free-radical initiators used is generally from 0.1 to 3% by weight, based on the total amount of the monomers to be polymerized. Particular preference is given to the use of initiators comprising ammonium and/or alkali metal peroxodisulfates or, respectively, tert-butyl hydroperoxide in combination with a reducing agent.

The way in which the free-radical initiator system is added to the polymerization vessel during the course of the free-radical aqueous emulsion polymerization according to the invention is known to the skilled worker. It may either be completely within the initial charge of the polymerization vessel or utilized stepwise or continuously as required by its consumption during the course of the free-radical aqueous emulsion polymerization. In any individual case this depends in a known manner both on the chemical nature of the initiator system and on the polymerization temperature. Preference is given to including a portion in the initial charge and introducing the remainder to the polymerization zone as required by consumption.

The usual known ionic and/or nonionic emulsifiers and/or protective colloids and/or stabilizers may be used for the emulsion polymerization.

Surface-active substances of this type are in principle the emulsifiers and protective colloids usually used as dispersing agents. A detailed account of suitable protective colloids is found in Houben-Weyl, Methoden der organischen Chemie, Vol. XIV/I, Makromolekulare Stoffe, Georg-Thieme-Verlag, Stuttgart, 1961, pp. 411–420. Possible emulsifiers are either anionic, cationic or nonionic emulsifiers. It is preferable for the surface-active substances used to be exclusively emulsifiers, which, unlike the protective colloids, usually have relative molecular weights below 1000. If mixtures of surface-active substances are used, the individual components of the material must, of course, be compatible with one another, and in case of doubt this can be checked using a few preliminary experiments.

The surface-active substances used preferably comprise anionic and nonionic emulsifiers. Examples of common coemulsifiers are ethoxylated fatty alcohols (EO number, from 3 to 50, alkyl: $C_8$ to $C_{36}$), ethoxylated mono-, di- and trialkylphenols (EO number: up to 50, alkyl: $C_4$ to $C_9$), alkali metal salts of the dialkyl sulfosuccinates, and also the alkali metal salts and ammonium salts of alkyl sulfates (alkyl: $C_8$ to $C_{12}$), of an ethoxylated alkanol (EO number: from 4 to 30, alkyl: $C_{12}$ to $C_{18}$), of ethoxylated alkylphenols (EO number: from 3 to 50, alkyl: $C_4$ to $C_9$), of alkylsulfonic acids (alkyl: $C_{12}$ to $C_{18}$) or of alkylarylsulfonic acids (alkyl: $C_9$ to $C_{18}$).

Other suitable dispersing agents are compounds of formula II

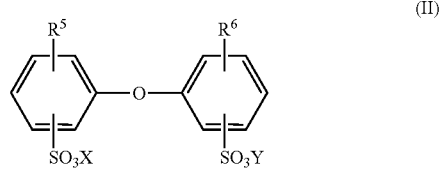

(II)

where $R^5$ and $R^6$ are hydrogen or $C_4$–$C_{14}$-alkyl, but not simultaneously hydrogen, and X and Y may be alkali metal ions and/or ammonium ions. $R^5$, $R^6$ are preferably hydrogen or linear or branched alkyl having from 6 to 18 carbon atoms, in particular 6, 12 or 16 carbon atoms, and are not simultaneously hydrogen. X and Y are preferably sodium, potassium or ammonium ions, particularly preferably sodium. Compounds II in which X and Y are sodium, $R^5$ is branched alkyl having 12 carbon atoms and $R^6$ is hydrogen or $R^5$ are particularly advantageous. Use is frequently made of industrial mixtures which have from 50 to 90% by weight of the monoalkylated product, for example Dowfax® 2A1 (Dow Chemical Company trademark).

Other suitable emulsifiers may be found in Houben-Weyl, Methoden der organischen Chemie, Vol. XIV/1, Makromolekulare Stoffe, Georg Thieme-Verlag, Stuttgart, 1961, pp. 192 to 208.

To adjust the molecular weight, regulators may be used during the polymerization. Examples of suitable regulators are compounds containing —SH, for example mercaptoethanol, mercaptopropanol, thiophenol, thioglycerol, ethyl thioglycolate, methyl thioglycolate, tert-dodecyl mercaptan or mercaptoacetic acid.

The aqueous dispersion of the polymers A) and B) may be obtained in a simple manner by mixing the aqueous dispersion of the ethylene polymer A) with the aqueous dispersion of the polymer B).

The proportion by weight of the polymer A) is preferably from 0.1 to 50%, particularly preferably from 0.5 to 20% and very particularly preferably from 1 to 10%, based on the total weight of A)+B). The proportion by weight of the polymer B) is therefore preferably from 99.9 to 50%, particularly preferably from 99.5 to 80% and very particularly preferably from 99 to 90%.

The adhesive preferably also comprises a thickener. Thickeners are auxiliaries which increase viscosity.

The proportion by weight of the thickener is generally from 0.1 to 5 parts, preferably from 0.5 to 3 parts, particularly preferably from 0.8 to 2 parts (dry and based on 100 parts by weight of the total weight of A) and B)).

Possible thickeners are the known thickeners, such as polyurethane thickeners, cellulose, silica, silicates (e.g. smectides), metal soaps, casein, starch, gelatin, polyvinyl alcohol and polyvinylpyrrolidone.

Particularly suitable thickeners for the purposes of the present invention are free-radical-polymerized polymers of ethylenically unsaturated compounds. Preference is given to polymers over 50% by weight of which has been built up from ethylenically unsaturated acids, from ethylenically unsaturated amides or from mixtures of these.

Ethylenically unsaturated acids which may be mentioned are acrylic acid, methacrylic acid, itaconic acid. Particular preference is given to acrylic acid and methacrylic acid. Amides which may be mentioned are in particular acrylamide and methacrylamide.

The polymer is particularly preferably composed of at least 70% by weight, very particularly preferably at least 90% by weight, of the ethylenically unsaturated acids and/or amides.

The polymer comprises in particular from 60 to 100% by weight, preferably from 80 to 99% by weight, of ethylenically unsaturated acids, and from 0 to 40% by weight, preferably from 1 to 20% by weight, of ethylenically unsaturated amides.

The thickener is preferably an aqueous dispersion, if desired with a content of organic cosolvents. Dispersing agents may be added in order to disperse the thickener in water. The thickeners may, however, also be added (e.g. as a powder) directly into the aqueous dispersion of the polymers A) or B).

The thickener and/or the aqueous dispersion of the thickener may be added in a simple manner to the aqueous dispersion of the binder.

The adhesive may comprise other additives, e.g. fillers, such as chalk, alumina trihydrate or barium sulfate, or organic fillers, e.g. polyethylene powder or polypropylene powder.

The preferred filler content is generally from 150 to 400 parts by weight, based on 100 parts by weight of the total of A) and B). An advantage of the present invention is that the filler content is preferably less than 200 parts by weight, in particular less than 100 parts by weight, or even less than 50 parts by weight.

The adhesives require less filler than conventional adhesives, or no filler at all. Even without filler, high strength and good adhesion are achieved in the floorcovering.

The floorcovering built up from more than one layer is preferably composed of a textile backing fabric through which the threads have been tufted. The backing fabric is mostly composed of polypropylene or polyester. The threads are, for example, polyamide fibers, polypropylene fibers, polyester fibers or natural fibers. To fix the threads in the backing fabric, a binder, e.g. a styrene-butadiene copolymer, is generally applied (precoat) to the reverse side of the tufted backing fabric. The precoat is usually applied as an aqueous dispersion which may have been filled with fillers, such as chalk, alumina trihydrate, barium sulfate or organic fillers, e.g. polyethylene powder. The precoat may also comprise antistats and other flame retardants, e.g. phosphoric ester derivatives and salts of a lower carboxylic acid with hygroscopic properties.

The adhesive is then applied to the precoat, which may have been dried or may be wet. The amount applied is generally from 50 to 1500 g/m$^2$, preferably up to 1000 g/m$^2$, particularly preferably from 50 to 500 g/m$^2$ (dry, i.e. without water).

The adhesive is preferably foamed on application, and the volume increase then improves its distribution on the surface.

The adhesive bonding to the secondary backing can then take place. The adhesives dry very rapidly. Examples of secondary backings are sheets made from natural or synthetic materials, e.g. polyester nonwovens or else needlefelts. The materials are preferably webs made from woven or nonwoven fibres, or are needlefelts.

The resultant floorcoverings having more than one layer feature very good layer adhesion, i.e. in particular of the secondary backing to the tufted backing fabric reinforced with precoat.

EXAMPLES

Production of Floorcoverings

A tufted backing fabric was provided with a precoat and dried. Adhesive was applied to the resultant precoated backing fabric, and the fabric was laminated to a textile secondary backing and dried. The amounts applied in g/m$^2$ are given in the tables.

The following aqueous precoats and adhesives were used in the individual experiments:

TABLE 1

| | Constituents | Parts by weight (dry) |
|---|---|---|
| Precoat 1 | SN LD 611 | 100 |
| | Chalk W 12 | 500 |
| | Latekol D | 0.2 |
| | Solids content 78% | |
| Precoat 2 | SN LD 791 | 100 |
| | Latekol D | 0.2 |
| Precoat 3 | SN LD 791 | 100 |
| | Chalk W 12 | 800 |
| | Latekol D | 0.2 |
| | Solids content 78% | |
| Adhesive 1 | SN LD 611 | 100 |
| | Chalk W 12 | 250 |
| | Latekol D | 0.2 |
| | Solids content 78% | |
| Adhesive 2 | SN LD 611 | 95 |
| | Poligen WE 3 | 5 |
| | Collacral HP | 1.0 |
| | Solids content 50% | |
| Adhesive 3 | SN LD 611 | 90 |
| | Polygen W3 | 10 |
| | Collacral HP | 1 |
| | Solids content 47.5% | |
| Adhesive 4 | SN LD 611 | 100 |
| | Chalk W 12 | 250 |
| | Latekol D | 0.2 |
| | Solids content 75% | |
| Adhesive 5 | SN LD 611 | 100 |
| | Latekol D | 0.2 |
| | Solids content 53% | |
| Adhesive 6 | SN LD 611 | 95 |
| | Polygen W3 | 5 |
| | Latekol D | 1 |
| Adhesive 7 | SN LD 611 | 90 |
| | Polygen W3 | 10 |
| | Latekol D | 1 |

Meanings of terms:
SN LD 611: Styrofan ® LD 611, butadiene/styrene copolymer, ethylene
Poligen ® WE 3: ethylene/acrylic acid copolymer
Chalk W 12: Calcicol W 12 from Alpha Calcit
Collacral ®: thickener, acrylic acid/acrylamide copolymer
Latekol ® D: thickener, polyacrylic acid Performance Tests The strength of the bond between the precoated backing fabric and the secondary backing was determined. The bond strength (dry) was determined in N/5 cm at 23° C. and 50% relative humidity using a Zwick (Ulm, Germany) model 1425 tensile testing machine. In each case the average force is given (F) together with the maximum force (Fmax). The bond strength of the wet composite was also determined (wet) after 12 hours of storage in water.

TABLE 2

Bond strength (5/32 wool fiber tufted into woven polypropylene (900 g/m$^2$); secondary backing: polypropylene needlefelt, 375 g/m$^2$)

| | Amount applied (dry) | | dry | | wet | |
|---|---|---|---|---|---|---|
| | Precoat | Adhesive | F | F max | F | F max |
| Precoat 1, Adhesive 4*) | 650 | 800 | 39.2 | 54.9 | 22.3 | 27.1 |
| Precoat 1, Adhesive 2 | 650 | 230 | 44.6**) | 64.6**) | 33.1 | 37.9 |
| Precoat 1, Adhesive 2 | 650 | 180 | 72.9 | 83.0 | 50.4 | 35.5 |
| Precoat 1, Adhesive 3 | 650 | 230 | 45.6**) | 73.0**) | 43.4 | 53.2 |
| Precoat 1 Adhesive 3 | 650 | 180 | 63.2 | 78.2 | 38.4 | 45.9 |

TABLE 2-continued

Bond strength (5/32 wool fiber tufted into woven polypropylene (900 g/m²); secondary backing: polypropylene needlefelt, 375 g/m²)

| | Amount applied (dry) | | dry | | wet | |
|---|---|---|---|---|---|---|
| | Precoat | Adhesive | F | F max | F | F max |
| Precoat 2, Adhesive 2 | 100 | 230 | 46.4**) | 64.9**) | 42.8 | 53.6 |
| Precoat 1, Adhesive 5*) | 650 | 230 | 42.1 | 53.1 | — | — |
| Precoat 1, Adhesive 7 | 650 | 230 | 41.9**) | 65.5**) | 44.2 | 52.5 |

*)for comparison
**)tufted threads were pulled out of the backing fabric

TABLE 3

Bond strength (1/8 polyamide fiber tufted into woven polypropylene (625 g/m²; secondary backing: polypropylene needlefelt (375 g/m²)

| | Amount applied (dry) | | dry | | wet | |
|---|---|---|---|---|---|---|
| | Precoat | Adhesive | F | F max | F | F max |
| Precoat 1, Adhesive 2 | 650 | 230 | 3.0 | 68.1 | 28.9 | 34.9 |
| Precoat 2, Adhesive 2 | 100 | 230 | 100.1 | 107.7 | 33.5 | 39.9 |

TABLE 4

Bond strength (5/32 polypropylene fiber tufted into polypropylene (650 g/m²); secondary backing: polypropylene needlefelt (330 g/m²)

| | Amount applied (dry) | | dry | | wet | |
|---|---|---|---|---|---|---|
| | Precoat | Adhesive | F | F max | F | F max |
| Precoat 3, Adhesive 4*) | 780 | 550 | 10.7 | 16.3 | 6.4 | 7.7 |
| Precoat 3, Adhesive 2 | 780 | 160 | 34.0 | 40.8 | 21.6 | 26.3 |
| Precoat 2, Adhesive 2 | 90 | 160 | 24.1 | 27.7 | 10.9 | 12.7 |

The drying rate was also determined.

10.5 g of adhesive 1 were compared with 4.6 g of adhesive 6 (identical polymer content)

Drying was to constant weight

Adhesive 1: dry after 75 minutes

Adhesive 2: dry after 50 minutes

In industrial-scale production, therefore, speed can be 30% greater under identical conditions.

The invention claimed is:

1. A textile floorcovering having more than one layer, wherein the layers have been bonded by an adhesive which comprises, as binder, an aqueous dispersion of a mixture made from a polymer A), at least 60% by weight of which is composed of ethylene and from a polymer B), at least 60% by weight of which is composed of vinylaromatics, dienes or mixtures of these, wherein the textile floorcovering is a tufted carpet, and wherein one layer is a tufted backing fabric, and one layer is a secondary backing bonded to said tufted backing fabric by said adhesive, wherein the proportion by weight of the polymer A) is from 1 to 5% by weight and that of B) is from 95 to 99% by weight, based on the total of A) and B).

2. An aqueous adhesive comprising, as binder, an aqueous dispersion of a mixture made from a polymer A), at least 60% by weight of which is composed of ethylene and from a polymer B), at least 60% by weight of which is composed of vinylaromatics, dienes or mixtures of these, and comprising a thickener, where the thickener is a copolymer of ethylenically unsaturated compounds at least 50% by weight of which are ethylenically unsaturated acids, ethylenically unsaturated amides or mixtures of these, wherein the proportion by weight of the polymer A) is from 1 to 5% by weight and that of B) is from 95 to 99% by weight, based on the total of A) and B).

* * * * *